UNITED STATES PATENT OFFICE.

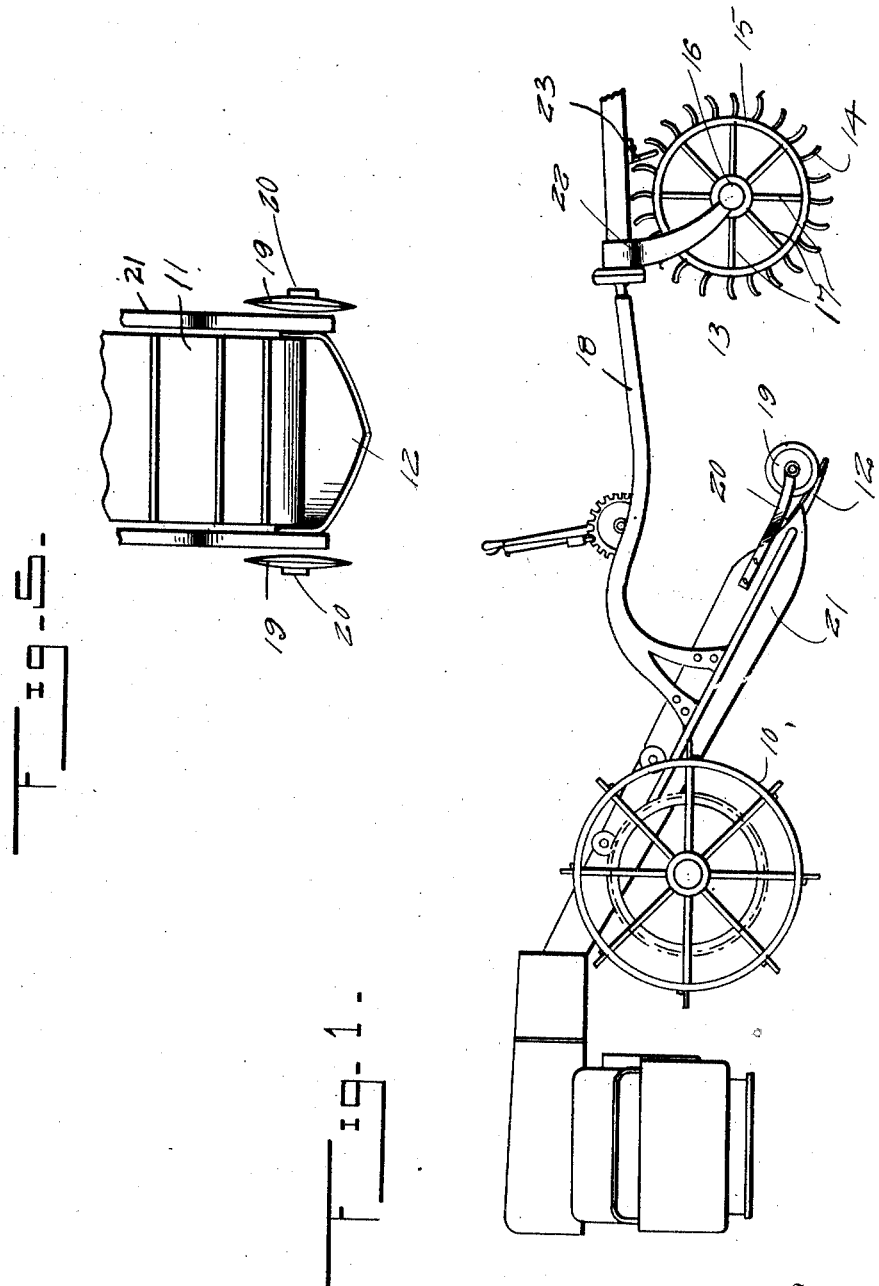

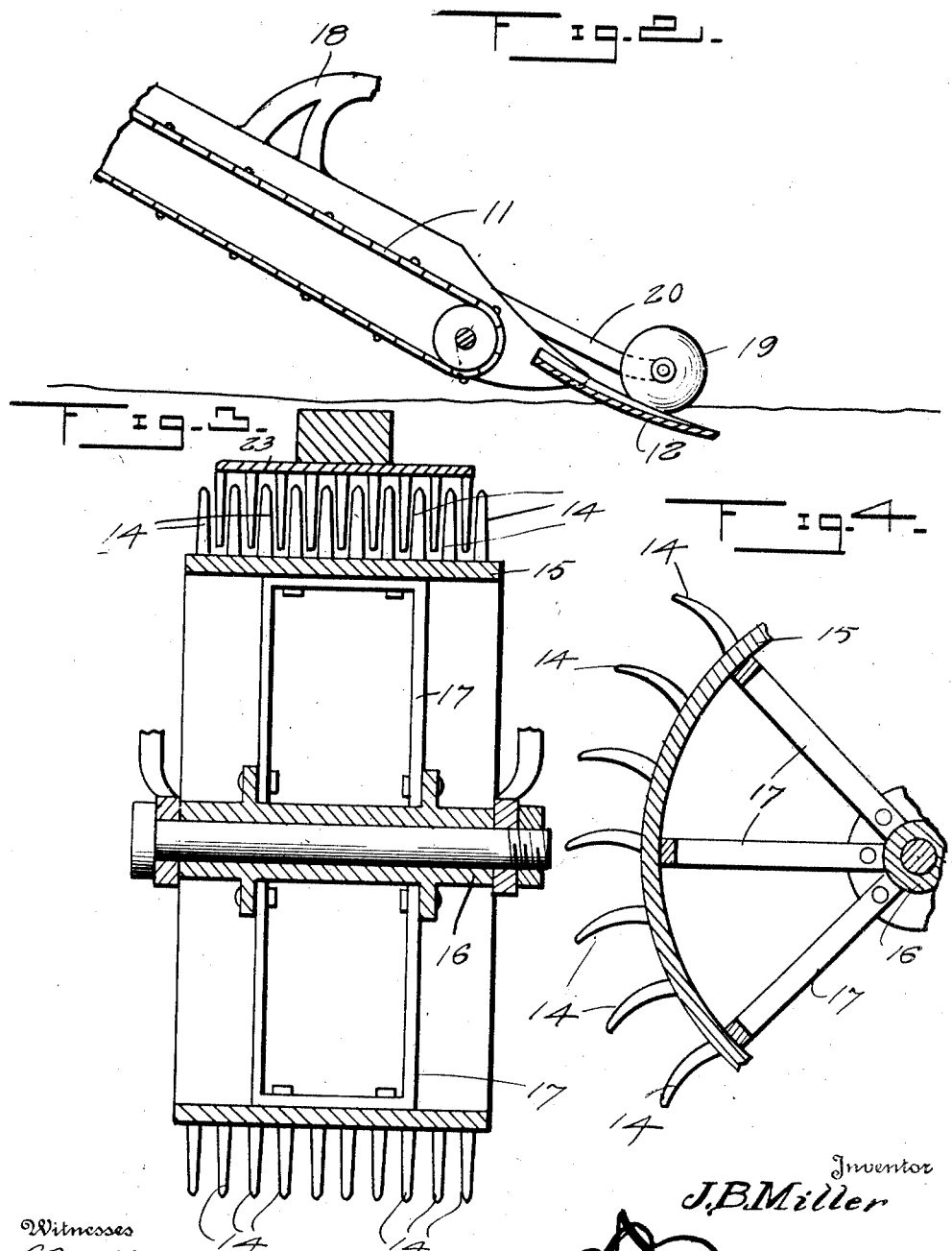

JOHN B. MILLER, OF SAUK CENTER, MINNESOTA.

QUACK-GRASS DIGGER.

1,334,255.  Specification of Letters Patent.  Patented Mar. 16, 1920.

Application filed April 4, 1918. Serial No. 226,673.

*To all whom it may concern:*

Be it known that I, JOHN B. MILLER, a citizen of the United States, residing at Sauk Center, in the county of Stearns and State of Minnesota, have invented certain new and useful Improvements in Quack-Grass Diggers; and I do hereby declare the following to be a full, clear, and exact description of the invention, such as will enable others skilled in the art to which it appertains to make and use the same.

The object of the invention is to provide a simple and comparatively inexpensive apparatus designed especially for digging, uprooting and removing quack grass, detaching the loose earth therefrom and depositing the grass itself in a suitable receptacle or vehicle or spreading it upon the surface of the ground so as to be dried and rendered unobjectionable, and more especially to provide means by which the surface of the ground in which the quack grass is growing is prepared for the operation of a following shovel or scoop by which the grass may be taken up and received by a suitable conveyer constituting a shaker.

With these and similar objects in view, the invention consists in a construction, combination and relation of parts hereinafter fully set forth, it being understood that changes in form, proportion and details may be resorted to, within the scope of the appended claims, without departing from the spirit of the invention.

In the drawing—

Figure 1 is a side view of a machine embodying a preferred form of the invention.

Fig. 2 is a sectional view of that portion of the machine embodying the shovel or scoop and the related cutter disks and the adjacent portion of the conveyer.

Fig. 3 is a detail enlarged sectional view of the digger wheel, taken in a plane parallel with the axis thereof.

Fig. 4 is a detail section of a portion of the digger wheel, taken in a plane at right angles to that of Fig. 3.

Fig. 5 is a front view of the shovel or scoop with the cutter disk and related parts of the machine.

Mounted upon a suitable supporting frame work having ground wheels 10 is a conveyer 11 with which is associated a shovel or scop 12 preferably located in rear of a digger wheel 13 which has a broad peripheral surface for contact with the soil and is provided with a plurality of circumferential series of radially disposed spurs or teeth 14 which are preferably curved or bent, as shown in detail in Fig. 4, to serve as means for breaking up the surface of the soil and uprooting the quack grass. The body portion of the wheel may be of any preferred construction but as illustrated it consists of the rim 15 and axle sleeve or hub 16 connected by the radial frames 17, the prongs or teeth being preferably independently attached to the rim so that they may be replaced when broken or injured, or may be removed for repair. This digger wheel is carried by a tongue 18 by means of which connection may be made with a tractor or other means for hauling, and the shovel or scoop is supported by the frame in such a position as to pass under the broken portion of the surface of the soil and raise the latter with the quack grass and its roots and deposit the same upon the conveyer which serves to detach the loose earth and carry the grass and roots to a point of deposit.

At each side of the plane of the shovel or scoop, and designed to separate the path of the latter from the adjoining soil, is a cutter disk 19, each being mounted upon a suitable bracket 20 supported by the aforesaid frame 21.

Obviously any suitable or preferred means may be employed for varying the depth of the cut of the shovel or scoop, such devices being common in the agricultural art, and in operation it is obvious furthermore that the action of the curved teeth or prongs of the digger wheel will serve not only to break up the soil and uproot the grass but in a large measure separate the same from the dirt or loose earth so as to prepare the same for the following operation of the shovel or scoop and the conveyer.

Moreover, it will be obvious that the construction of the essential elements of the machine may be used in connection with and applied to one of the well known types of potato diggers having a shovel or scoop and a conveyer for conducting the material to a suitable conveyer, the digger wheel of this device being applied by means of an attachable bracket arm 22 to the tongue or beam of such a machine so as to operate in advance of said shovel or scoop, while the marking or cutter disks are arranged on opposite sides of said shovel as and for the purpose hereinabove indicated.

As a means of preventing the teeth of the digger wheel from carrying the material around with it, and thereby involving the accumulation of material on the teeth and an interference with the proper operation of the device, a toothed scraper 23 may be supported by the tongue or beam of the machine, the teeth being arranged intercurrently with the teeth on the wheel as shown in detail in Fig. 3. As the digger wheel rotates, should portions of the growing plants become entangled therewith and carried upward by the teeth of the wheel, such accumulation will be detached and caused to drop back upon the ground in position to be taken up by the shovel or scoop as hereinbefore explained.

As will be clearly noted from Figs. 1 and 4 of the drawings, the spurs 14 are given a decided curvature, as previously stated, this curvature being reverse to the direction of rotation of the digging wheel during advancement of the machine. This digging wheel acts as a supporting member for the forward or front end of the machine and is held into firm engagement with the ground surface thereby. As the machine advances the digging wheel rotates in a clockwise direction as considered in Fig. 1, the spurs 14 acting to affectually cut up and pulverize the soil so as to loosen the grass roots and separate them therefrom, these roots being then engaged by the scoop 12 which directs them onto the elevator 11 in the manner described. Due to the reverse curvature of the spurs 14, these spurs will shed practically all of the grass roots thus preventing entangling of the roots with the spurs such as would occur if the spurs were straight and disposed truly radial of the wheel. In the event that any of the roots should become entangled with the spurs, these roots will be removed by the teeth of rake or comb structure 23, the roots thus removed slipping readily off of the teeth and being gradually worked rearwardly so as to be discharged upon the ground surface in rear of the digging wheel.

What is claimed is:

1. In a machine of the character described, a portable supporting frame, a conveyer carried thereby, a forwardly directed scoop for delivering material to the conveyer during advancement of the machine, and a digging wheel positioned in advance of and in alinement with said scoop and corresponding approximately in width thereto, said wheel being provided with outwardly projecting spurs curved reversely to the direction of rotation of the wheel during advancement of the machine, said spurs acting to pulverize the soil so as to separate the grass roots therefrom and the reverse curvature of the teeth preventing accumulation of roots thereby.

2. In a machine of the character described, a portable supporting frame, a conveyer carried thereby, a forwardly directed scoop associated with said conveyer for delivering grass roots thereto during advancement of the machine, a tongue extending forwardly of said frame, and a digging wheel secured to said tongue in advance of and in alinement with said scoop, said wheel providing a third point of support for the machine so as to be held in tight contact with the ground surface and being provided with outwardly projecting spurs for pulverizing the soil during advancement of the machine.

3. In a machine of the character described, a digging wheel mounted for engagement with the ground surface and provided with a plurality of outwardly projecting spurs curved longitudinally reversely to the direction of rotation of the wheel during advancement of the machine, a toothed scraper supported adjacent said wheel and provided with a plurality of teeth between which the spurs of said wheel are adapted to pass, the rearward curvature of the spurs permitting material carried thereby and engaged by the teeth of said scraper to readily slide over said spurs toward the outer ends thereof so as to be easily removed without breakage from these spurs, and means positioned in rear of said digging wheel for collecting grass roots separated from the soil thereby.

In testimony whereof I affix my signature in presence of two witnesses.

JOHN B. MILLER.

Witnesses:
 DAN S. RILEY,
 E. C. RILEY.